United States Patent Office 3,570,133
Patented Mar. 16, 1971

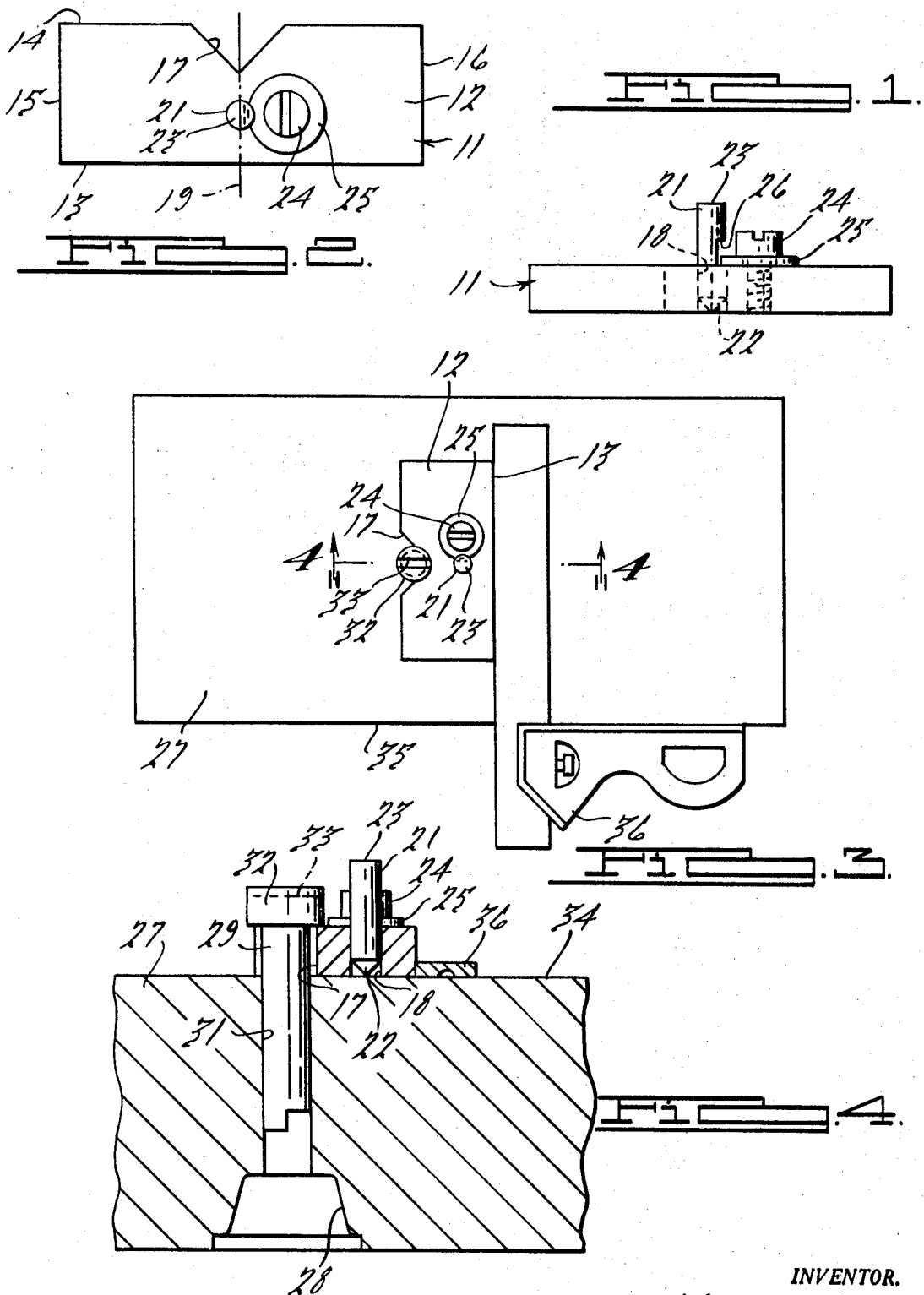

3,570,133
SPOTTING FIXTURE AND METHOD OF USE
Folke Halward, 29625 Bristol Lane,
Birmingham, Mich. 48010
Filed Jan. 22, 1969, Ser. No. 792,942
Int. Cl. G01b *3/00*
U.S. Cl. 33—189                                 4 Claims

ABSTRACT OF THE DISCLOSURE

A spotting fixture comprising a rectangular plate notched at one edge and having a punch slidably mounted with its axis on a line bisecting the notch and perpendicular to said edge. The fixture is used to drill a locking pin hole in a mold plate or ejector plate assembly of the type having a core pin or ejector pin which is to be held in position by the locking pin. To use the fixture, the notch is placed against the core or ejector pin and the fixture plate is held at a specified angle with respect to an edge of the mold plate or ejector plate assembly. The punch is then struck to indent the surface of the mold plate or ejector plate assembly. The locking pin hole is drilled at the indentation.

BACKGROUND OF THE INVENTION (1) Field of the invention

The invention relates to spotting fixtures, and particularly to fixtures for locating a hole to be drilled with exact reference to a pin in another hole already drilled.

(2) Description of the prior art

Kusnery Pat. No. 2,800,693 shows a construction for locking core or ejector pins which are to be held in a certain orientation with respect to plastic molds and die casting dies. More particularly, this patent shows a core or ejector pin having a diametrically slotted head, and an angular locking pin having one portion entering a hole alongside the core or ejector pin hole and another portion fitting in the slot of the core or ejector pin head to prevent it from rotating. It is important that the locking pin hole be drilled accurately to control the position of the core or ejector pin, and at the same time it is desirable that the drilling method be fast and convenient.

The conventional way to drill the locking pin holes is to use a milling or jig boring machine on the table of which the mold plate is firmly secured. The machine spindle is then aligned with respect to each core or ejector pin hole, and the machine table is moved a desired distance for subsequent drilling of the locking pin hole. This procedure must be repeated for each core or ejector pin hole for which a locking pin hole is needed. The resulting procedure is slow and tedious and the method can be very expensive when a large number of pins and cores are involved.

SUMMARY OF THE INVENTION

The illustrated embodiment of the invention comprises a rectangular steel plate having a 90° V notch at the center of one long edge thereof, accurately machined so that each side of the notch forms a 45° angle with respect to the edge of the plate. A hardened steel punch is slidably mounted adjacent and on a line bisecting the notch. A screw and washer are provided for retaining the punch on the fixture plate.

The fixture is used by holding the V notch against the core or ejector pin mounted in the mold plate or ejector pin assembly, and holding the opposite edge of the fixture plate at right angles, or at another predetermined angle, with respect to an edge of the mold plate or ejector plate assembly. While in this position the punch is hit by a hammer blow to indent the surface of the mold plate or ejector plate assembly. This procedure is repeated for each core or ejector pin for which a locking pin is required. The mold plate or injector assembly is then drilled using the indentations as guides.

Thus, locking hole spotting can be done on a bench instead of occupying a precision machine, and the spotting operation may be performed by a relatively unskilled operator and with an ordinary drill press. The fixture spotting operation is much faster than conventional machine methods and the invention offers more flexibility for obtaining various angular locations of the locking pin with respect to the core or ejector pin. Since the spotting fixture method of this invention locates directly from core or ejector pin rather than its hole, it is highly accurate. Thus, where components of a mold assembly are to be spotted and where the core or ejector pin holes have been transferred from the mold plates in an erratic manner, as frequently happens during transfer drillings, the spotting fixture method of this invention will reduce errors. The spotting fixture may also be used as a drill fixture by removing the punch and using the punch hole as a guide. The fixture is relatively small and is thus portable, fitting into the ordinary toolmaker's box. The same fixture may be used to accommodate all commonly used core and ejector pin diameters.

BRIEF DESCRIPTION OF THE DRAWINGS

FIG. 1 is a side elevational view of the locking pin spotting fixture;
FIG. 2 is a top plan view thereof;
FIG. 3 shows the spotting fixtures used in practice, and
FIG. 4 is an enlarged fragmentary cross-sectional view in elevation taken along the line 4—4 of FIG. 3.

DESCRIPTION OF THE PREFERRED EMBODIMENT

The spotting fixture is generally indicated at 11 and comprises a rectangular plate 12 having two long edges 13 and 14 and two short edges 15 and 16. Edges 13 and 14 are exactly parallel to each other. A V notch 17 is formed in edge 14 of fixture plate 12, this V notch being shown as a 90° notch with its sides at 45° to edge 14.

A punch hole 18 is formed in a central portion of plate 12 on a line 19 which bisects notch 17 and is therefore perpendicular to edges 13 and 14. An indentation punch 21 is slidably mounted in hole 18, this punch having a pointed end 22 and a flat top 23 and being of considerably greater height than the thickness of plate 12.

A screw 24 is threadably mounted in plate 12 adjacent pin 21 and retains a washer 25. This washer is received by a notch 26 in one side of pin 21 so that the pin cannot be removed from plate 12. The length and location of notch 26 is such that punch 21 may be completely withdrawn from the underside of plate 12. The diameter of washer 25 is somewhat larger than the diameter of screw 24 so that when the screw is loosened the washer may be slipped away from pin 21 and the pin removed.

To demonstrate the use of spotting fixture 11, a mold plate 27 is shown having a cavity 28 on one side thereof, the mold plate also having a core pin 29 slidably mounted in a hole 31. It will be understood that instead of mold plate 27 and core pin 29, the spotting fixture could be used to locate a locking pin hole for an ejector pin mounted in an ejector plate assembly. As described in the aforementioned patent, core pin 29 has a head 32 with a diametrical slot 33 to receive one leg of an angular locking pin (not shown), the other leg of the locking pin being mounted in a hole alongside hole 31. The problem is to locate the locking pin hole exactly with respect to the core pin, so that the orientation of pin 29 will be correct.

According to the invention, fixture 11 is placed upon surface 34 of mold plate 27 and, with core pin 29 in hole 31, notch 17 is brought to bear against pin 29 as shown in FIGS. 3 and 4. Edge 13 of plate 12 is then placed at right angles to edge 35 of plate 27, for example by a toolmaker's square 36. Punch 21 is then struck by a hammer (not shown) forming an indentation in plate 27. This procedure is repeated for each core or ejector pin to be provided with a locking pin. The punch mold or ejector plate assembly is then drilled using the indentations as locating guides for the drill. This will be readily and accurately accomplished as the small diameter drills (approximately 1/16 to 1/8 inch diameter) used for the locking pins will be guided by the indentations. Since punch 21 is on line 19 which bisects notch 17 and is perpendicular to edges 13 and 14, the position of the locking pin hole will accurately locate the locking pin with respect to the core or ejector pin. Instead of bringing edge 13 of plate 12 at right angles to edge 35 of mold plate 27, it may be held at another predetermined angle by a variable angle or bevel protractor, used in the same manner as toolmaker's square 36.

What is claimed is:

1. In a fixture for spotting a locking pin hole for a mold cavity core pin, a flat plate having parallel straight edges, a V notch in one of said edges engageable with said core pin and formed so that a line bisecting the V notch is perpendicular to said edges, a punch, an aperture through said plate spaced from but adjacent said V notch and on said bisecting line, said punch slidably mounted in said aperture to move only perpendicularly to said plate, and means releasably retaining said punch on said plate.

2. The combination according to claim 1, said releasable retaining means comprising a screw threadably mounted in said plate and holding a washer, a notch in said punch, said washer being received by said notch.

3. The combination according to claim 2, the inner diameter of said washer being greater than the diameter of said screw, whereby said washer may be withdrawn from said punch notch to permit removal of the punch from the plate.

4. In a method for spotting a locking pin hole for a mold cavity core pin, the steps of placing said core pin in its hole in the mold plate, providing a fixture plate with parallel edges and an angular notch on one edge and a punch hole in said fixture plate on a line bisecting said angular notch and perpendicular to said sides, placing said notch against said core pin, holding said edges of the fixture plate at a predetermined angle with respect to one edge of the mold plate, and then indenting the surface of the mold plate using said punch hole as a guide.

References Cited
UNITED STATES PATENTS 3,031,669   5/1962   Lawson _____ 33—180

LEONARD FORMAN, Primary Examiner

S. STEPHAN, Assistant Examiner

U.S. Cl. X.R.

33—180